(12) United States Patent
Watanabe

(10) Patent No.: US 11,192,240 B2
(45) Date of Patent: Dec. 7, 2021

(54) ROBOT

(71) Applicant: FANUC CORPORATION, Yamanashi (JP)

(72) Inventor: Hideyuki Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/004,490

(22) Filed: Aug. 27, 2020

(65) Prior Publication Data

US 2021/0069895 A1    Mar. 11, 2021

(30) Foreign Application Priority Data

Sep. 10, 2019  (JP) .............................. JP2019-164089

(51) Int. Cl.
*B25J 9/04*    (2006.01)
*B25J 19/00*   (2006.01)

(52) U.S. Cl.
CPC ........... *B25J 9/044* (2013.01); *B25J 19/0029* (2013.01)

(58) Field of Classification Search
CPC . B25J 9/04; B25J 9/044; B25J 19/0025; B25J 19/0029
USPC ....................................................... 74/490.02
See application file for complete search history.

(56) References Cited

U.S. PATENT DOCUMENTS

| 5,205,701 A | * | 4/1993 | Kigami | ................. B25J 9/0009 285/305 |
| 9,266,244 B2 | * | 2/2016 | Larsson | ............... B25J 19/0075 |
| 9,764,483 B2 | * | 9/2017 | Okahisa | ................... B25J 18/00 |
| 9,806,457 B2 | * | 10/2017 | Watanabe | .............. H01R 13/60 |
| 2004/0261563 A1 | * | 12/2004 | Inoue | ................... B25J 19/0025 74/490.03 |
| 2020/0009722 A1 | * | 1/2020 | Yamashiro | ................. B25J 9/06 |

FOREIGN PATENT DOCUMENTS

| EP | 2 551 068 | * | 1/2013 |
| JP | H11-888 A | | 1/1999 |
| JP | 2003-136464 A | | 5/2003 |
| JP | 2012-218118 A | | 11/2012 |
| JP | 2015-123551 A | | 7/2015 |
| JP | 2016-215371 A | | 12/2016 |

* cited by examiner

*Primary Examiner* — William C Joyce
(74) *Attorney, Agent, or Firm* — Maier & Maier, PLLC

(57) ABSTRACT

A robot including a second arm supported by a first arm so as to be swingable around an axis line, the second arm has an arm main body supported by the first arm in a swingable manner, and a cover which is attached to the arm main body. The robot further includes an interface member attached to the cover, a cable support member one where end of which is fixed to the arm main body and the other end of which is exposed outside the second arm by passing through a hole or a cutout provided in the interface member, and a seal which seals a space between the cable support member and the interface member and which allows movement of the cable support member in a direction along the axis line with respect to the interface member.

4 Claims, 9 Drawing Sheets

ROBOT

CROSS-REFERENCE TO RELATED APPLICATIONS

This application is based on and claims priority to Japanese Patent Application No. 2019-164089 filed on Sep. 10, 2019, the content of which is incorporated herein by reference in its entirety.

FIELD

This invention relates to a robot.

BACKGROUND

Conventionally, there is a known horizontal articulated robot which includes a base, a first arm which is supported by the base so as to be swingable around a first axis line, a second arm which is supported by the first arm so as to be swingable around a second axis line which is parallel to the first axis line, a third arm having a cylindrical shape, which is supported by the second arm so as to be rotatable around an axis line which is parallel to the second axis line, and so as to be movable along the axis line, and a tool which is attached at a lower end of the third arm. For example, Japanese Unexamined Patent Application, Publication No. 2012-218118 is shown below.

SUMMARY

An aspect of the present disclosure is a robot including a base; a first arm supported by the base so as to be swingable around a first axis line; and, a second arm supported by the first arm so as to be swingable around a second axis line that is parallel to the first axis line, wherein the second arm includes: an arm main body supported by the first arm so as to be swingable around the second axis line; and a cover attached to the arm main body, the robot further includes: an interface member which is attached to the cover and to which at least one of a cable or a pipe is connected; a cable support member one end of which is fixed to the arm main body and the other end of which is exposed outside the second arm by passing through a hole or a cutout which is provided in the interface member; and, a seal which seals a space between the cable support member and the interface member and which allows movement of the cable support member in a direction along the second axis line with respect to the interface member.

DETAILED DESCRIPTION OF EMBODIMENTS

A horizontal articulated robot 1 in accordance with a first embodiment will be described below with reference to the accompanying drawings.

Figure 1:
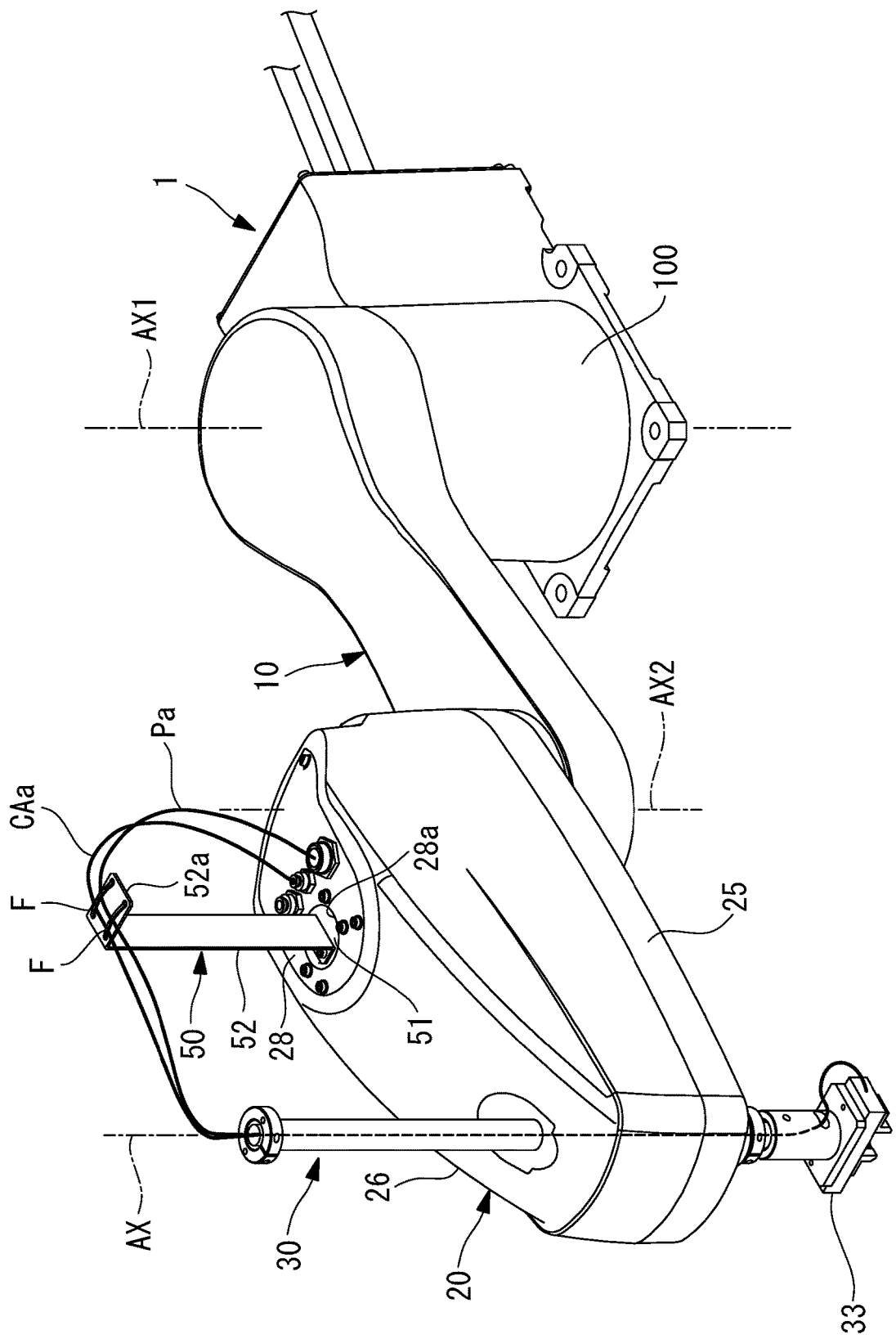
FIG. 1 is a perspective view of a robot according to a first embodiment of the present invention.
Figure 2:
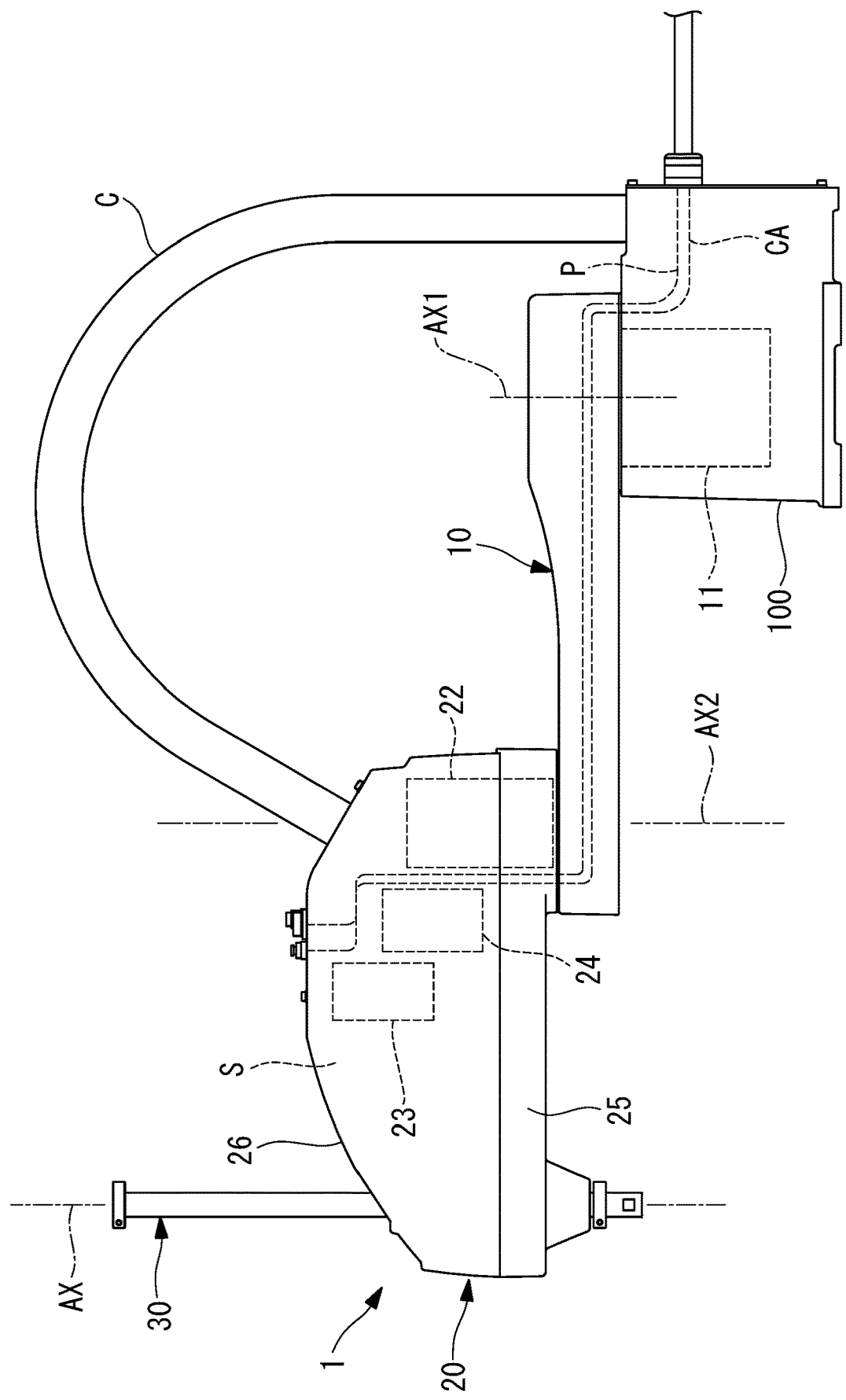
FIG. 2 is a side view of the robot of this embodiment.

As shown in FIGS. 1 and 2, this horizontal articulated robot 1 according to this embodiment includes a base 100 and a first arm 10 which is supported by the base 100 so as to be swingable around a first axis line AX1 extending in an up-and-down direction. Also, the robot 1 includes a second arm 20 which is supported by the first arm 10 so as to be swingable around a second axis line AX2 which extends in the up-and-down direction, and a third arm 30 which is supported by the second arm 20. The robot 1 is controlled by a controller 40.

As shown in FIGS. 1 and 2, a proximal end side of the first arm 10 is supported by the base 100 so as to be swingable around the first axis line AX1, and a proximal end side of the second arm 20 is supported by a distal end side of the first arm 10 so as to be swingable around the second axis line AX 2. Also, a third arm 30 is a shaft-like member which extends in the up-and-down direction, and is supported by the distal end side of the second arm 20 so as to be movable in the up-and-down direction, and to be rotatable around an axis line AX which extends in the up-and-down direction. The base 100 has a hollow portion, and a lower side thereof may have an opening.

As shown in FIG. 2, a first axis motor 11, which is a servo motor and the like, is attached to the inside of the base 100, and when the first axis motor 11 is driven, the first arm 10 swings around the first axis line AX1. A second axis motor 22, which is a servo motor and the like for driving the second arm 20, is attached to the inside of the second arm 20. Also, at the inside of the second arm 20, a third axis motor 23 which is for moving the third arm 30 along the axis line AX and which is a servo motor and the like is attached, and a fourth axis motor 24 for rotating the third arm 30 around the axis line AX is attached as well.

Figure 5:
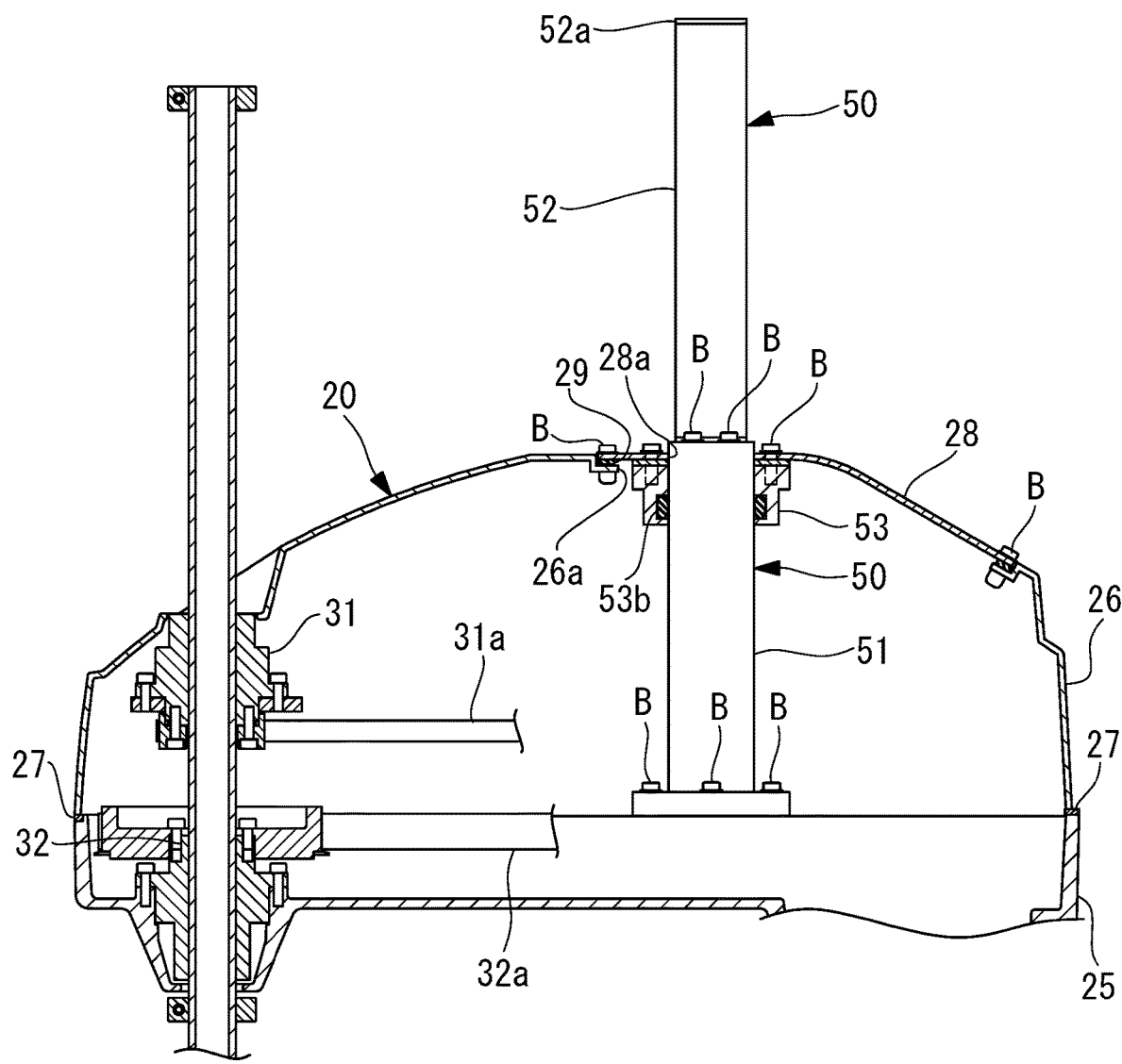
FIG. 5 is a sectional view of the second arm of the robot of this embodiment.

As shown in FIG. 5, the third arm 30 is supported at a distal end side of the second arm 20 by means of a ball screw nut 31 and a ball spline nut 32. As disclosed in Japanese Unexamined Patent Application, Publication No. 2014-4638 and the like, such configuration is known, therefore the description thereof is omitted. In one example, the ball screw nut 31 is supported at the distal end side of the second arm 20 so as to be rotatable around the axis line AX, and the ball spline nut 32 is also supported by the distal end side of the second arm 20 so as to be rotatable around the axis line AX. The ball spline nut 32 and the ball screw nut 31 are positioned so as to be aligned in the up-and-down direction. Rotational force of the third axis motor 23 is transmitted to the ball screw nut 31 through a belt 31a, and by this, the ball screw nut 31 rotates. On the other hand, rotational force of a forth axis motor 24 is transmitted to the ball spline nut 32 through a belt 32a, and by this, the ball spline nut 32 rotates.

The third arm 30 is a ball screw spline shaft, and an outer peripheral surface of the third arm 30 is provided with a ball screw groove (now shown) having a spiral shape, with which metal balls of the ball screw nut 31 are engaged, and a spline groove (not shown) with which metal balls of the ball spline nut 32 are engaged. For that reason, when the ball screw nut 31 rotates due to the third axis motor 23, the third arm 30 moves along the axis line AX, and when the ball spline nut 32 rotates due to the fourth axis motor 24, the third arm 30 rotates around the axis line AX.

Figure 3:
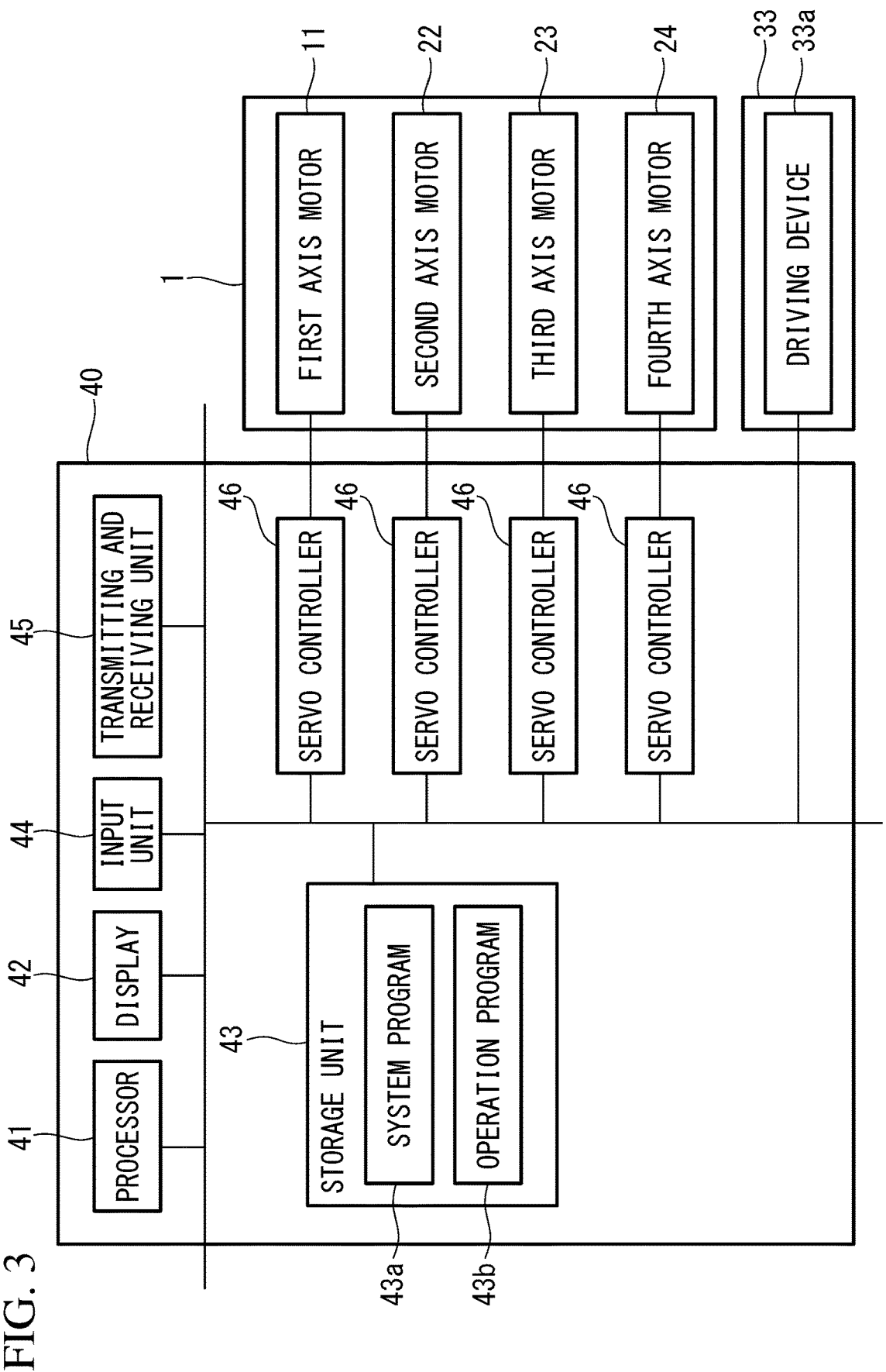
FIG. 3 is a block diagram of a controller of the robot of this embodiment.

As shown in FIG. 3, the controller 40 includes a processor 41 such as a CPU and the like, a display 42, a storage unit 43 having a nonvolatile storage, a ROM, a RAM, and the like, an input unit 44 which is a keyboard, a touch panel, an operation panel, and the like, a transmitting and receiving unit 45 for transmitting and receiving signals, and servo controllers 46 each of which is connected to motors 11, 22, 23, 24.

A system program 43a is stored in the storage unit 43, and the system program 43a provides a basic function of the controller 40. Also, an operation program 43b is stored in the storage unit 43. On the basis of the operation program 43b, the controller 40 sends a control signal for controlling the motors 11, 22, 23, 24 to the servo controllers 46, and also, the controller 40 transmits electrical power, a control signal, and the like to a driving device 33a (FIG. 3) of a tool 33, and by this, the robot performs operations. The tool 33 is a hand and the like, and is provided at the lower end of the third arm 30. The driving device 33a is a motor and the like.

The robot 1 and the controller 40 are connected by means of a plurality of cables CA, which are a signal line, a power line, and the like, a plurality of pipes P for supplying fluid, and the like. In this embodiment, a power supply apparatus (not shown) which is for supplying power to motors 11, 22, 23, 24 is provided at the inside of the controller 40, the power supply apparatus may be provided separately from the controller 40. As shown in FIG. 2, one end side of a part of the cables CA and one end side of a part of the pipes P are arranged at the inside of the base 100, and the other end sides thereof are arranged at the inside of the second arm 20. The part of the cables CA and the part of the pipes P may be guided from the base 100 to the second arm 20 through a conduit C which is shown in FIG. 2. Note that the conduit C is only shown in FIG. 2.

As shown in FIGS. 1 and 2, the second arm 20 includes an arm main body 25 which is supported by the first arm 10 so as to be swingable around the second axis line AX2, and a cover 26 which is attached to the arm main body 25. The arm main body 25 is made of metal for example, and the arm main body 25 supports the third arm 30. The arm main body 25 may be made of other material as long as the arm main body 25 can support the third arm 30. In this embodiment, the arm main body 25 includes the motors 22 through 24, the ball screw nut 31, and the ball spline nut 32, and the arm main body 25 includes a frame, member, and the like which are for fixing the motors 22 through 24, the ball screw nut 31, and the ball spline nut 32 to the arm main body 25.

In this embodiment, a second axis motor 22, a third axis motor 23, and a fourth axis motor 24 are fixed to an upper surface side of the arm main body 25. A side of the arm main body 25, to which the motors 22 through 24 are fixed, is covered by the cover 26. That is to say, the motors 22 through 24 are arranged within a space S which is surrounded by the arm main body 25 and the cover 26.

Figure 4:
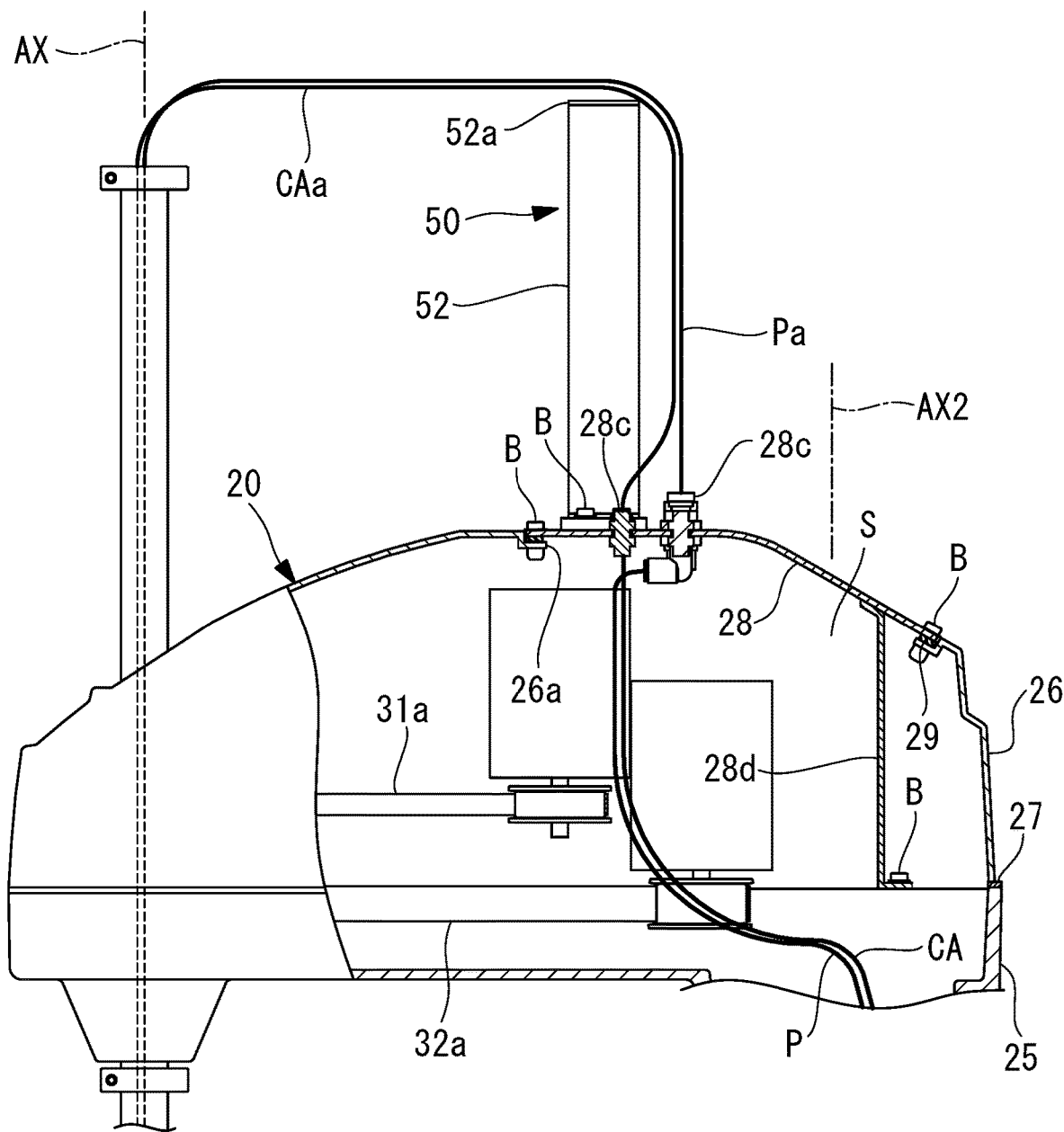
FIG. 4 is a partial cross-sectional view of a second arm of the robot of this embodiment.

As shown in FIGS. 4 and 5, a first seal 27 is provided on a periphery of the arm main body 25, to which the motors 22 through 24 are fixed, and the first seal 27 is arranged between the arm main body 25 and the cover 26. The first seal is made of a material having rubber-like elasticity for example, and is in a shape along the periphery of the arm main body 25. The material having the rubber-like elasticity is rubber, silicone, or the like.

As shown in FIGS. 4 and 5, an opening portion 26a is formed in a part of the cover 26, and an interface member 28 is attached to the periphery of the opening portion 26a by means of a plurality of bolts (fastening members) B. The opening portion 26a is closed by attaching the interface member 28 to the cover 26. The interface member 28 is made of metal for example, and the interface member 28 includes a plurality of connecting portions 28c, each of which protrudes from one surface in a thickness direction of the interface member 28 and from the other surface in the thickness direction thereof. The connecting portions 28c are a connector for the cables CA, the pipes P, and the like. In this embodiment, the one surface in the thickness direction is a surface at a side of the space S.

As described above, the other end side of the part of the cables CA and the other end side of the part of the pipes P are arranged at the inside of the second arm 20, and the other end of the part of the cables CA and the other end of the part of the pipes P are respectively connected to the connecting portions 28c (FIG. 4). Also, one end of a distal end side cable CAa and one end of a distal end side pipe Pa are respectively connected to the connecting portions 28c on the other surface of the interface member 28 in the thickness direction. The other end side of the distal end side cable CAa and that of the distal end side pipe Pa are inserted through the third arm 30, and the other end of the distal end side cable CAa and that of the distal end side pipe Pa are connected to the tool 33.

A second seal 29 is attached to the periphery of the opening portion 26a, and the second seal 29 is arranged between the cover 26 and the interface member 28. The second seal 29 is made of a material having rubber-like elasticity, and is in a shape along the periphery of the opening 26a of the cover 26. The material having the rubber-like elasticity is rubber, silicone, or the like. As shown in FIG. 4, a portion 28d of the interface member 28 may be fixed to the arm main body 25 by means of a bolt B.

Figure 6:
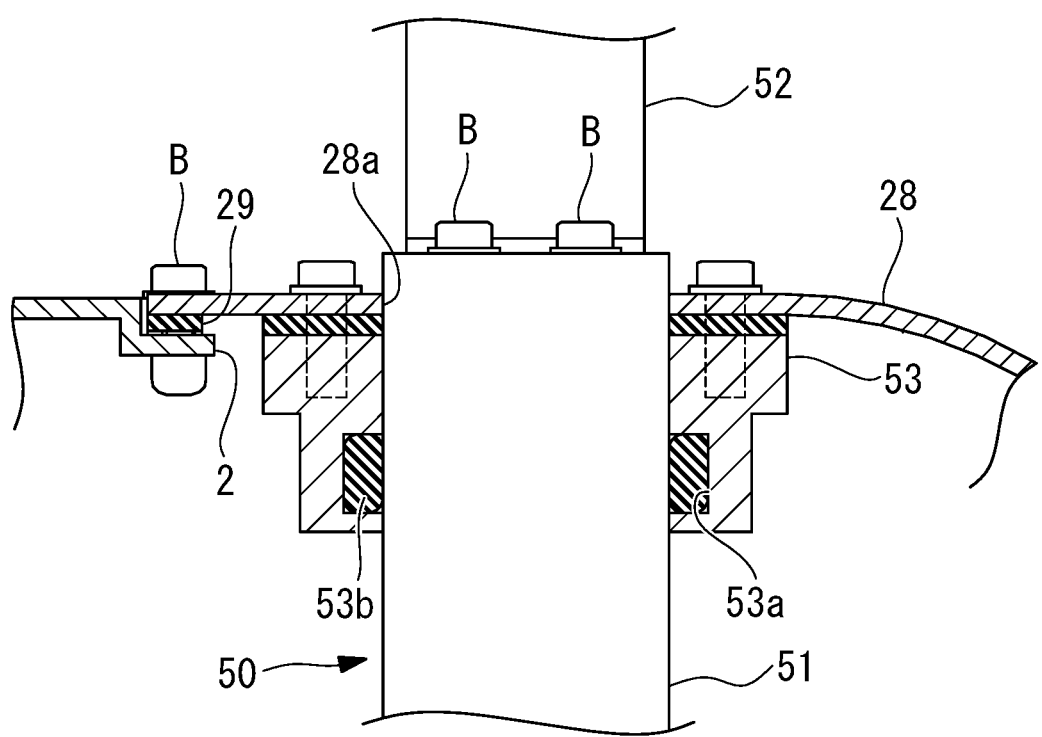
FIG. 6 is a sectional view of a main part of the second arm of the robot of this embodiment.

As shown in FIGS. 1, 5, and 6, a hole 28a, which penetrates the interface member 28 in the thickness direction, is formed in the interface member 28. On the other hand, an arm side member 51 having a substantially cylindrical shape is arranged within the hole 28a. The arm side member 51 in this embodiment is made of metal, however, it is possible to use another material as long as strength of the arm side member 51 is secured. One end of the arm side member 51 is fixed to the arm main body 25 by means of the bolt B and the like, which is a fastening member, and the other end side of the arm side member 51 is exposed outside the second arm 20 by passing through the hole 28a so as to be exposed outside the second arm 20.

As shown in FIGS. 1, 5, and the like, one end of a cable attaching member 52 is fixed to the other end of the arm side member 51 by means of the fastening member such as the bolt B and the like, and the cable attaching member 52 extends from its one end toward its other end in a direction which is mainly along the second axis line AX2. As shown in FIG. 1, the distal end side cable CAa and the distal end side pipe Pa are fixed to the other end side of the cable attaching member 52 by means of fixing members F which are binding bands referred to as an insulok. More specifically, in the distal end side cable CAa and the distal end side pipe Pa, a portion which is located between the connecting portion 28c and the third arm 30 is fixed to the other end of the cable attaching member 52.

In this embodiment, the cable attaching member 52 is formed by performing bending process on a metal plate-like member. A fixed portion 52a which extend in a direction orthogonal to the second axis line AX2 is formed on the other end of the cable attaching member 52, and the distal end side cable CAa and the distal end side pipe Pa are fixed to the fixed portion 52a. In this embodiment, a cable support member is constituted by the arm side member 51 and the cable attaching member 52.

As shown in FIGS. 5 and 6, a cover side member 53 is fixed to one surface of the interface member 28 in the thickness direction by means of the plurality of bolts B which are fastening members. The cover side member 53 is made of metal, plastic, or the like, and is in a ring shape. The cover side member 53 is provided at a position corresponding to the hole 28a of the interface member 28, and a hole of the cover side member 53 is positioned so as to align with the hole 28a of the interface member 28. A space between the cover side member 53 and the interface member 28 is sealed by a seal member and the like, which is not shown. A sealing groove 53a is provided at the inner peripheral surface of the cover side member 53, and the sealing groove 53a is provided over an entire periphery of the inner peripheral surface of the cover side member 53. A seal 53b, which is an O-ring or an oil seal, is placed inside the sealing groove 53a.

The arm side member 51 of the cable support member 50 is inserted through the cover side member 53, and the seal 53b has contact with the outer peripheral surface of the arm side member 51. On the other hand, an outer diameter of the arm side member 51 is smaller than an inner diameter of the hole 28a of the interface member 28 and that of the hole of the cover side member 53. A space between the arm side member 51 and the cover side member 53 is sealed by the seal 53b, and the seal 53b allows movement of the arm side member 51 in the direction which is along the second axis line AX2 with respect to the interface member 28 and the cover side member 53.

Figure 7:
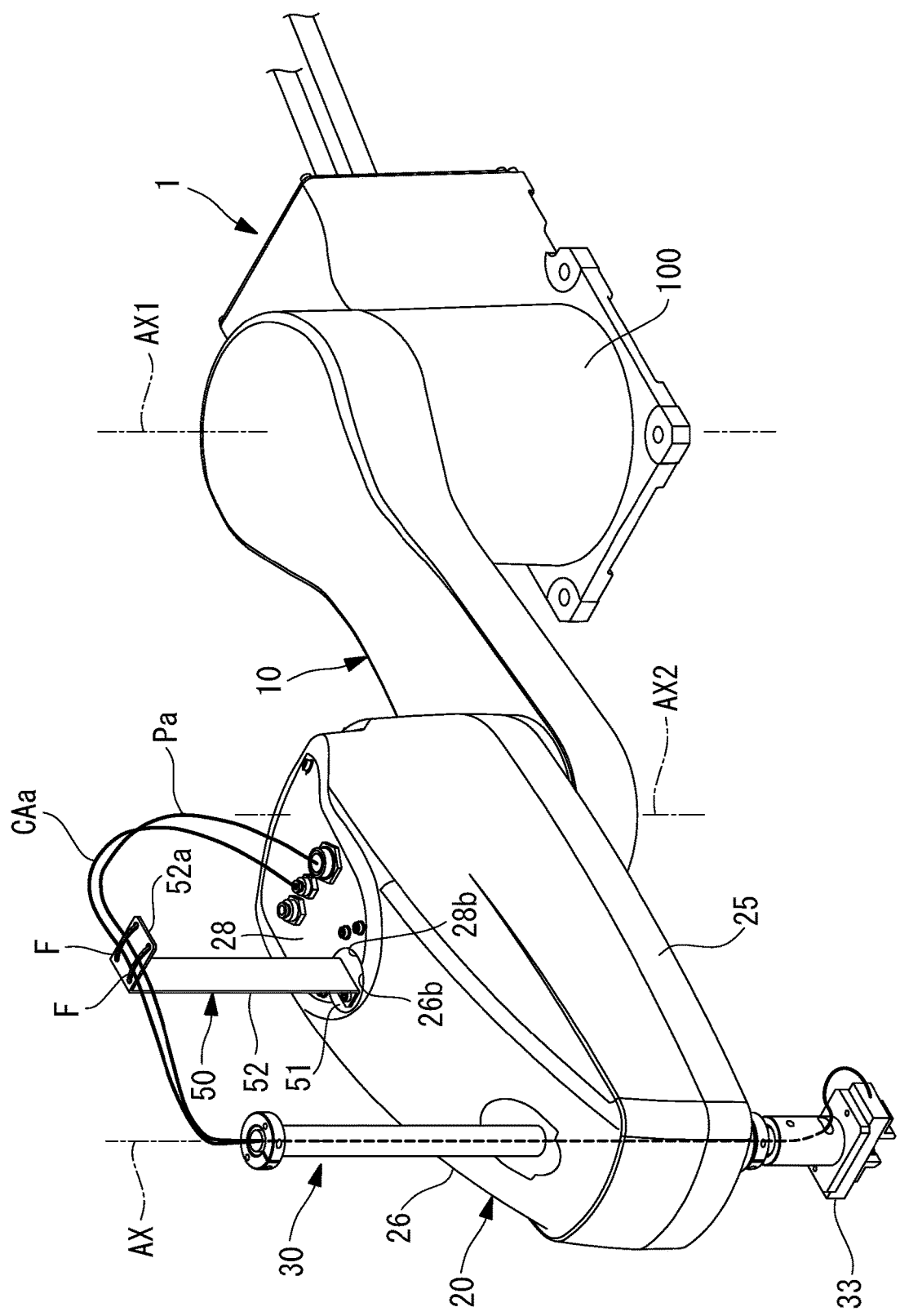
FIG. 7 is a perspective view of a main part of the robot according to a first modified example of the present embodiment.
Figure 8:
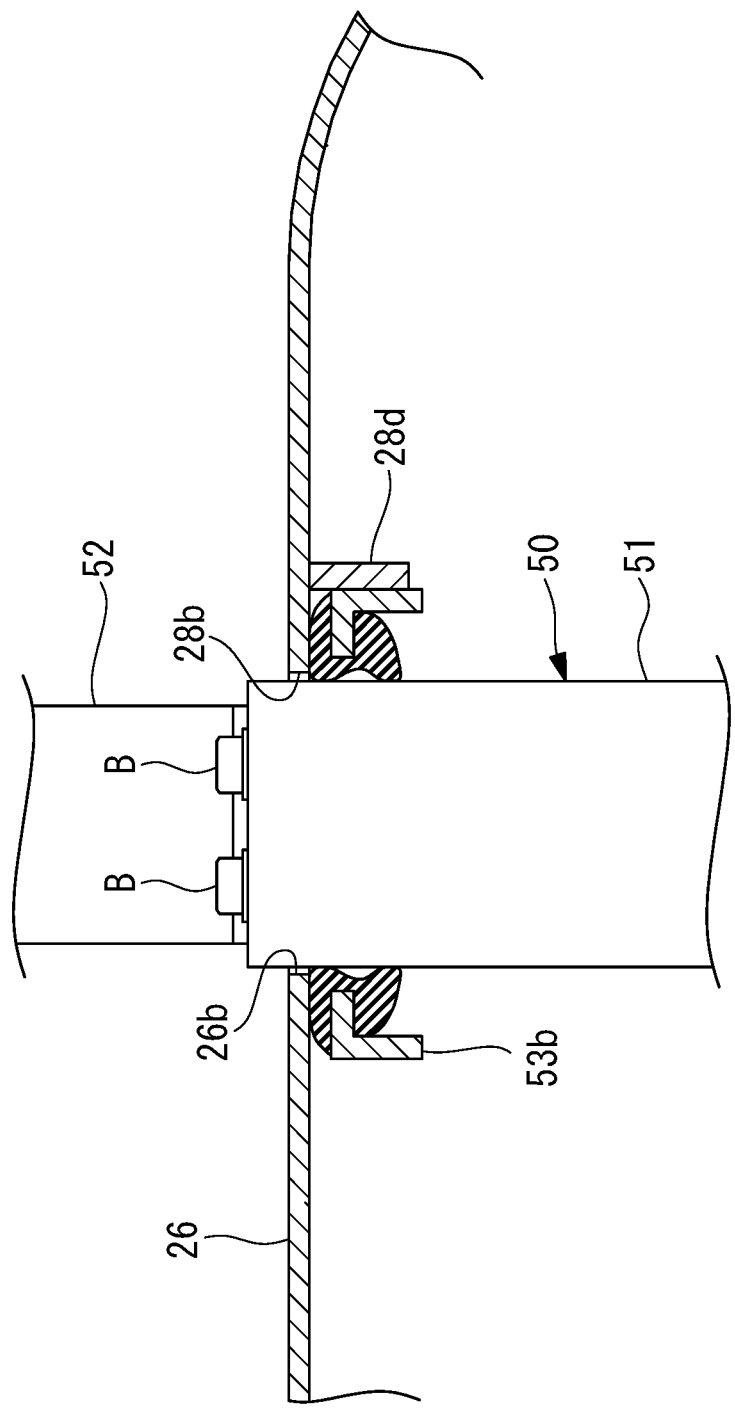
FIG. 8 is a sectional view of a main part of the second arm of the robot according to the first modified example of the present embodiment.

Also, in the above described embodiment, the other end of the arm side member 51 is exposed from the hole 28a which is provided in the interface member 28. Instead of this configuration, as shown in FIG. 7, it may be possible to provide a cutout 28b to the interface member 28, and to provide a cutout 26b at a position in the cover 26, which corresponds to the cutout 28b, so that the other end of the arm side member 51 is exposed from the cutouts 26b, 28b. In this case, as shown in FIGS. 7 and 8, seals 53b, which are an oil seal and the like, are fixed to positions which correspond to the cutouts 26b, 28b in the interface member 28 and/or the cover 26.

For example, the seal 53b is fixed to a metal piece 28d of the interface member 28 by welding. In this case also, a space between the interface member 28 including the cover 26 and the arm side member 51 is sealed by the seal 53b. Also, the arm side member 51 is movable in the direction along the second axis line AX2 with respect to the interface member 28 and the cover 26. Instead of fixing the seal 53b in the above described manner, the cover side member 53 may be fixed to the interface member 28, and a space between the cover side member 53 and the arm side member 51 may be sealed by the seal 53b.

Also, in the above described embodiment, the cable support member 50 which is constituted by the arm side member 51 and the cable attaching member 52 is shown. Instead of this, the cable support member 50 may only have the arm side member 51. In this case, the arm side member 51 is slightly longer, and the distal end side cable CAa and the distal end side pipe Pa are fixed to the other end of the arm side member 51 by means of the fixing members F. Note that, in such a case where the cable support member 50 is configured by the arm side member 51 and the cable attaching member 52, weight of an upper end side of the cable support member 50 can be reduced, and degree of freedom of design of the upper end side of the cable support member 50 is increased.

In this embodiment, the interface member 28 is attached to the cover 26 of the second arm 20. Also, the one end of the cable support member 50 is fixed to the arm main body 25 of the second arm 20, the cable attaching member 52, which is the other end of the cable support member 50, is exposed outside the second arm 20 by passing through the hole 28a or the cutout 28b, which are provided to the interface member 28. Also, a space between the cable support member 50 and the interface member 28 is sealed by the seal 53b.

Therefore, it is possible to arrange the cable support member 50 at a position which is close to the interface member 28 while securing the sealing of the inside of the second arm 20. Also, the seal 53b allows the movement of the cable support member 50 in a direction which is along the second axis line AX2 with respect to the interface member 28, therefore, it is possible to secure sealing by a first seal 27, sealing by a second seal 29, and sealing by the seal 53b regardless of a dimension error, an assembly error, and the like of the parts. This is advantageous for securing the sealing of the inside of the second arm 20.

Also, in this embodiment, the cable support member 50 includes the arm side member 51 and the cable attaching member 52. With the arm side member 51, the one end thereof is fixed to the arm main body 25, and the other end thereof is exposed outside the second arm 20 by passing through the hole 28a or the cutout 28b. With the cable attaching member 52, the one end thereof is fixed to the arm side member 51, and the cable CAa, the pipe Pa, and the like are attached to the other end side thereof. Due to this configuration, the degree of freedom of the design of the cable attaching member 52 is increased, and it is possible to reduce the weight of the cable attaching member 52.

Also, in this embodiment, a cover side member 53 which is in a ring shape is attached at a position corresponding to the hole 28a or the cutout 28b of the interface member 28, and a space between the cover side member 53 and the cable support member 50 is sealed by the seal 53a. With this configuration, it is possible to certainly seal the space between the cover side member 53 and the cable support member 50 while easily and certainly sealing the space between the seal 53 and the interface member 23.

Also, in this embodiment, the seal 53b is the O-ring or the oil seal. This configuration is advantageous for achieving the sealing of the space between the interface member 28 and the cable support member 50 at low cost and for sure.

Figure 9:
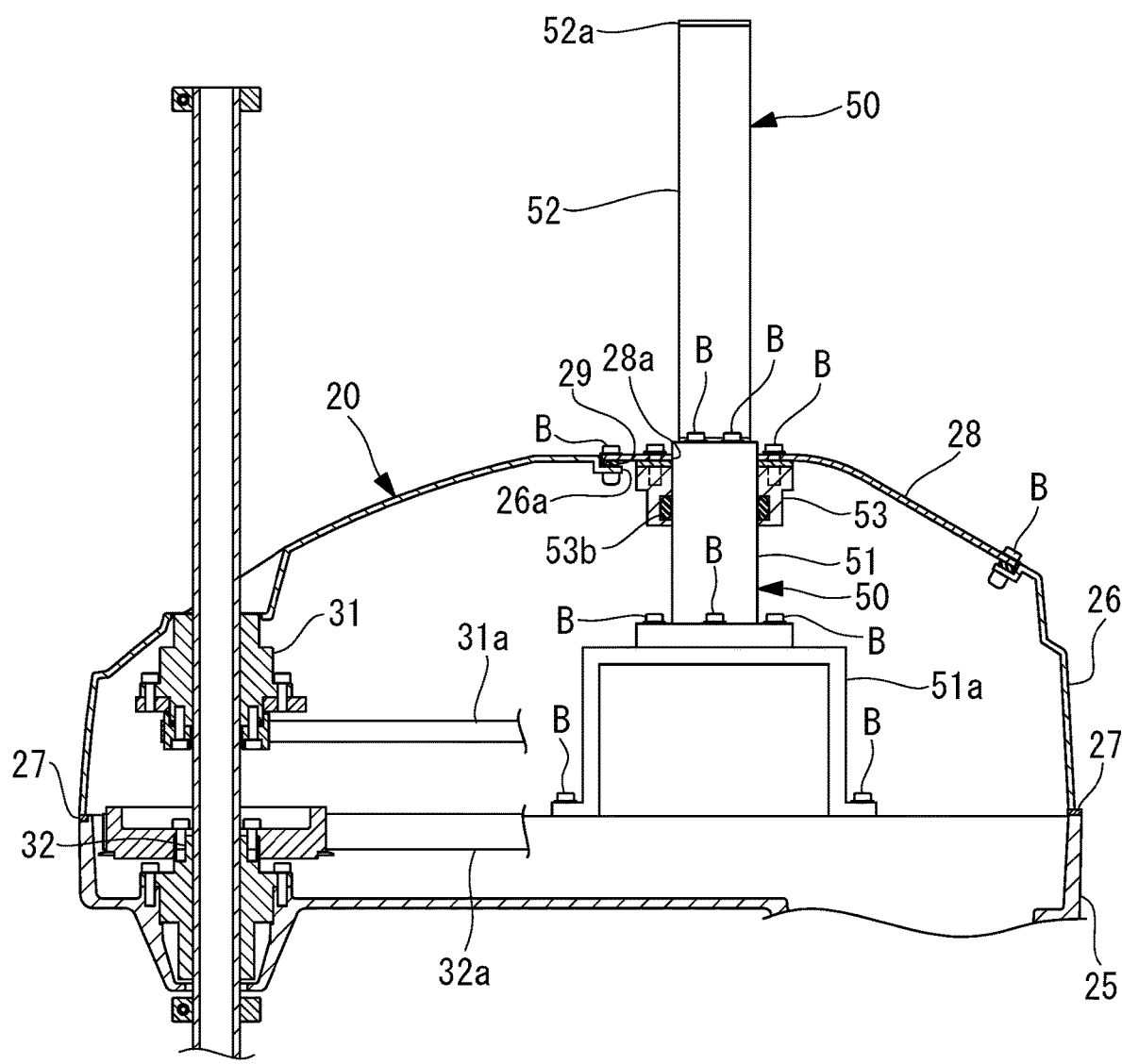
FIG. 9 is a sectional view of the second arm of the robot according to a second modified example of the present embodiment.

Also, as shown in FIG. 9, the arm side member 51 may have a pedestal 51a. In this case, it is possible to place components of the second arm 20 underneath the pedestal 51a. Also, the one end of the arm side member 51 may be fixed to the frame, the member, and the like, which fix the motors 22, 23, 24, and the like in the arm main body 25.

The invention claimed is:

1. A robot comprising:
   a base;
   a first arm supported by the base so as to be swingable around a first axis line; and,
   a second arm supported by the first arm so as to be swingable around a second axis line that is parallel to the first axis line, wherein, the second arm includes: an arm main body supported by the first arm so as to be swingable around the second axis line; and a cover attached to the arm main body, the robot further comprises:

an interface member which is attached to the cover and to which at least one of a cable or a pipe is connected;

a cable support member where one end of the cable support member is fixed to the arm main body and the other end of which is exposed outside the second arm by passing through a hole or a cutout which is provided in the interface member; and, a seal which seals a space between the cable support member and the interface member and which allows movement of the cable support member in a direction along the second axis line with respect to the interface member.

2. The robot according to claim 1, wherein the cable support member comprises an arm side member where one end of the arm side member is fixed to the arm main body and the other end of which is exposed outside the second arm by passing through the hole or the cutout, and a cable attaching member where one end of the cable attaching member is fixed to the arm side member, wherein at least one of the cable or the pipe is attached to the other end side of the cable attaching member.

3. The robot according to claim 1, wherein a cover side member which has a ring shape is attached to a position of the interface member, the position corresponding to the hole or the cutout, and a space between the cover member and the cable support member is sealed by the seal.

4. The robot according to claim 1, wherein the seal is an O-ring or an oil seal.

* * * * *